United States Patent [19]
Horne

[11] Patent Number: 5,822,005
[45] Date of Patent: Oct. 13, 1998

[54] PRE-ODDIFICATION

[75] Inventor: Caspar Horne, Santa Clara, Calif.

[73] Assignee: Tektronix, Inc., Wilsonville, Oreg.

[21] Appl. No.: 584,494

[22] Filed: Jan. 11, 1996

[51] Int. Cl.$^6$ .............................. H04N 7/12; H04N 11/02; H04N 11/04; H04N 9/64

[52] U.S. Cl. ......................... 348/405; 348/419; 348/718; 348/398

[58] Field of Search .................................... 348/405, 419, 348/718

[56] References Cited

U.S. PATENT DOCUMENTS

| | | | |
|---|---|---|---|
| 4,807,033 | 2/1989 | Keesen et al. | 382/56 |
| 5,218,650 | 6/1993 | Blonstein et al. | 382/56 |
| 5,481,553 | 1/1996 | Suzuki et al. | 371/49.1 |
| 5,515,105 | 5/1996 | Lim | 348/405 |

Primary Examiner—Tommy P. Chin
Assistant Examiner—Nhon T. Diep
Attorney, Agent, or Firm—Francis I. Gray

[57] ABSTRACT

Pre-oddification of quantized discrete cosine transform (DCT) coefficients representing video data reduces high frequency noise that accumulates over multiple stages of encoding/decoding due to oddification in the decoders. The quantized DCT coefficients are inverse quantized, and the resulting inverse quantized coefficients are summed. If the sum is even, then the last quantized coefficient [7,7] is adjusted to reduce high frequency energy accumulation at that coefficient. The last quantized coefficient may be set to zero, or may be incremented/decremented by "1" in the opposite manner than oddification occurs in the decoders. Further the values of a quantization matrix may be set, either manually or automatically as a function of the complexity of the video data, to assure that it is possible for the sum of the inverse quantized coefficients to be odd.

8 Claims, 2 Drawing Sheets

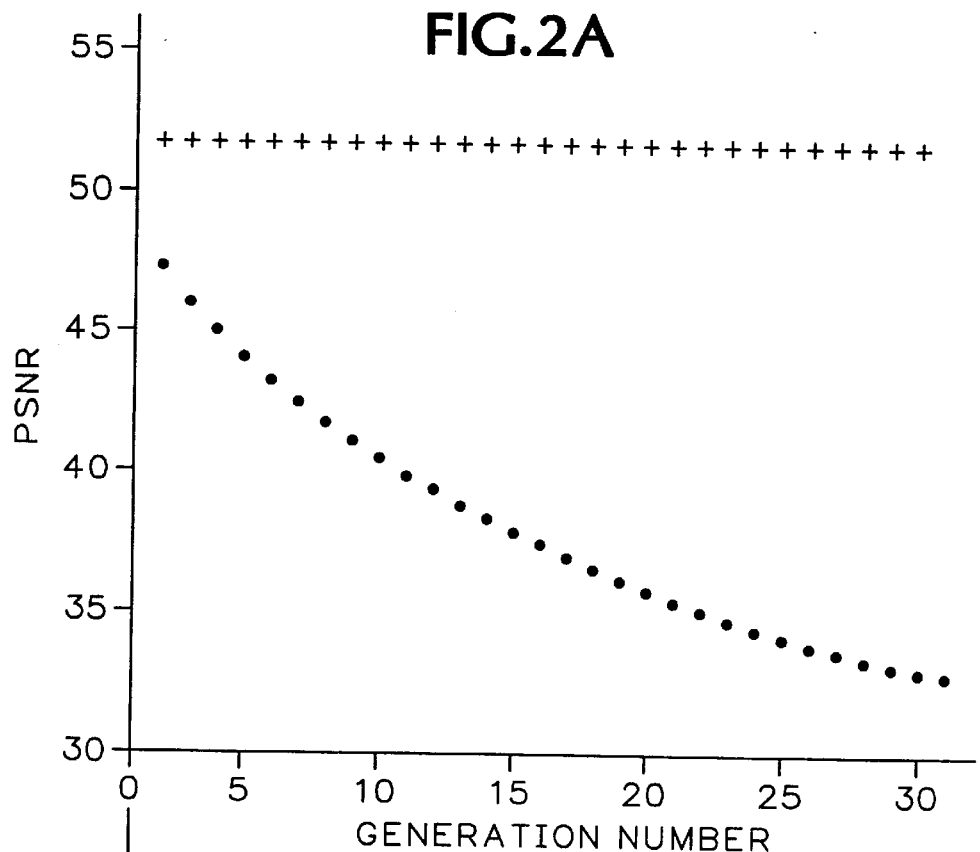
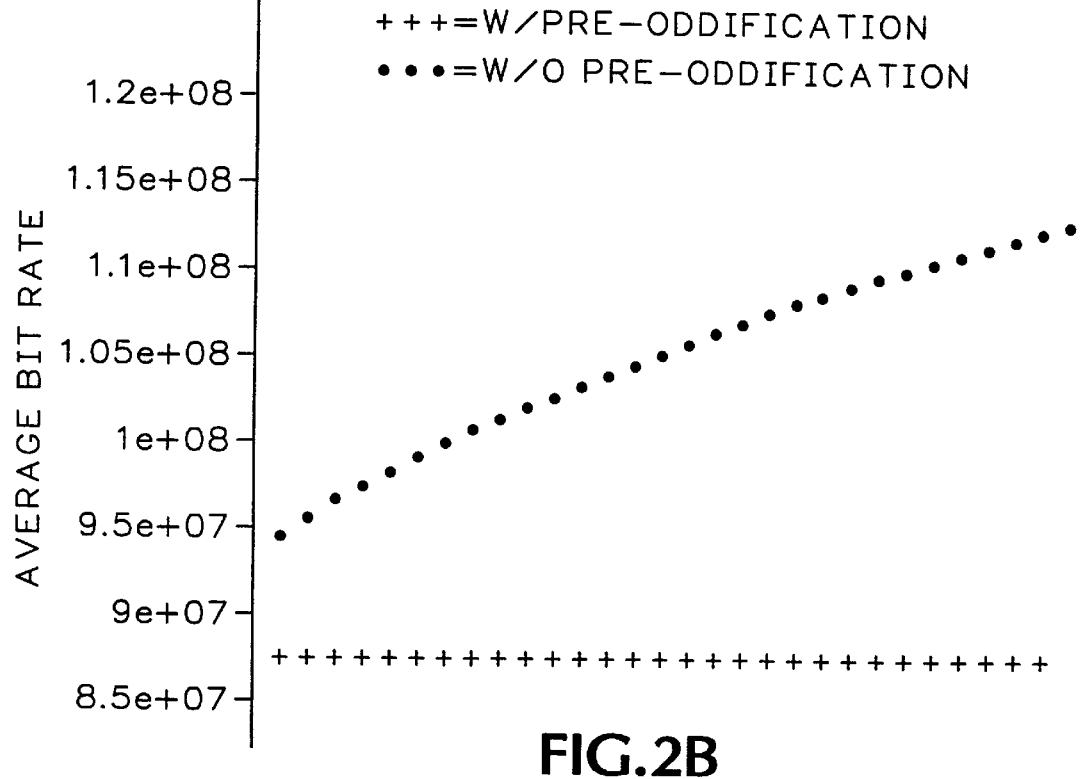

PRE-ODDIFICATION

BACKGROUND OF THE INVENTION

The present invention relates to data compression of video data, and more particularly to a method and apparatus for pre-oddification of the video data prior to compression to prevent noise build-up in multi-generation coding.

In the emerging 422 video profile for the MPEG2 data compression standard, an area of interest is multi-generation coding, i.e., multiple stages of encoding/decoding in a video signal path, while maintaining high quality. In the MPEG1 and MPEG2 data compression standards one of the steps in the decoding algorithm is related to mismatch control, also known as "oddification", and is performed after inverse quantization. Mismatch occurs because the discrete cosine transform (DCT) functions between an encoder and decoder are different. As described in ISO/IEC 13818-2 Section 7.4 oddification is done by adding all reconstructed saturated coefficients together and testing whether the sum is odd or even. If the sum is even, a correction is made to the last coefficient, i.e., the coefficient at location [7,7] in an 8×8 coefficient array. Namely +1 is added if coefficient [7,7] is even, and −1 is added if coefficient [7,7] is odd. In this manner the sum of the coefficients is always odd.

In multi-generation coding, where there is a succession of encoding/decoding cascaded operations, oddification may have an adverse effect on the perceived quality of the resulting video image display. At higher bit rates, such as those specified by the 422 video profile for MPEG2 data compression, oddification may cause an accumulation of energy in the coefficient [7,7], resulting in increasing high frequency noise with each generation.

For example, for a quantization scale of 2 0and a quantization matrix of values all 16, inverse quantization for intra-coded blocks according to ISO/IEC 13818-2 is defined by $$F[v][u]=(QF[v][u]*16*2*2)/32$$

which gives all even values, and thus the sum of all coefficients is even, given that the discrete cosine value is even. Therefore +1 gets added to coefficient [7,7]. The inverse discrete cosine transfer (DCT) spreads this over the whole block, after which the coefficients get rounded to integer values. Taking DCT followed by quantization shows this increased energy in coefficient [7,7]. If the sum of all coefficients is even again, which is likely for a quantization scale of 2, oddification adds +1 again to coefficient [7,7] and energy increases for each generation of this coefficient. Over 32 generations the peak signal to noise ratio may drop more than 15 dB.

To retain high quality over multiple generations, not performing oddification would greatly improve the quality. However this requires a change in the syntax of MPEG2, which is undesirable from a compatibility point of view, and probably would be unacceptable by the MPEG community.

What is desired is a mechanism for reducing the increase in energy in coefficient [7,7] caused by oddification according to the MPEG2 data compression standard.

SUMMARY OF THE INVENTION

Accordingly the present invention provides a method and apparatus for pre-oddification of the quantized discrete cosine transform (DCT) coefficients in order to avoid oddification in the decoder. The simplest technique based upon the premise of minimizing or avoiding accumulating energy at the last coefficient [7,7] in the block of an 8×8 inverse quantized coefficient array, is to make quantized coefficient [7,7] zero when the sum of inverse quantized coefficients is even. Alternatively a +1 could be added to quantized coefficient [7,7] where the decoder would add −1, and vice versa. Another alternative is to additionally change the values in a quantization matrix so that it is possible for the sum of all of the inverse quantized coefficients to be odd. Adding to or subtracting from the quantized coefficient [7,7] a "1" changes the inverse quantized coefficient [7,7] from odd to even, and vice versa. Consequently the sum of all inverse quantized coefficients can always be made odd just by changing one of the quantized coefficients.

The objects, advantages and other novel features of the present invention are apparent from the following detailed description when read in light of the appended claims and attached drawing.

BRIEF DESCRIPTION OF THE DRAWING

FIG. 2 is a graphic diagram comparing the effects of oddification over multiple generations of encoding/decoding with and without pre-oddification according to the present invention.

DESCRIPTION OF THE DRAWING

Figure 1:
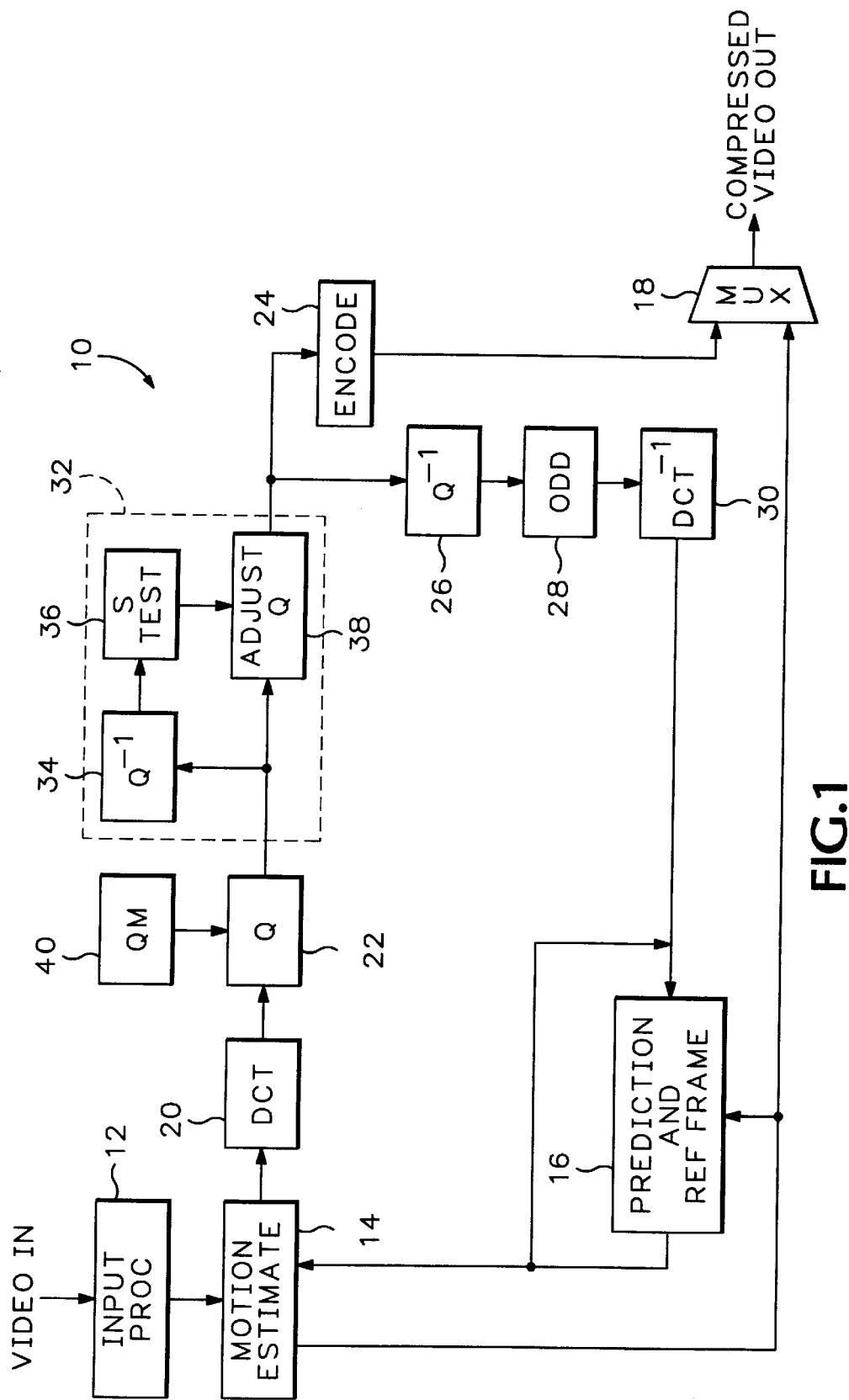
FIG. 1 is a block diagram of an apparatus for pre-oddification of quantized coefficients for an MPEG encoder according to the present invention.

Referring now to FIG. 1 a typical MPEG encoder 10 receives an input video signal that is applied to an input processor 12 for preprocessing of the signal to place it in appropriate form for the encoder. The preprocessed video signal is input to a motion estimator 14 that compares a reference frame from a predictor and reference frame buffer 16 with a current frame from the preprocessed video signal to determine for each block of pixels representing a portion of the image of the current frame whether there is motion relative to the reference frame. The resulting motion vector from the motion estimator 14 is used by the predictor and reference frame buffer 16 to generate the next reference frame, and also is output to a multiplexer 18. The differences between the current frame and reference frame from the motion estimator 14 are input to a discrete cosine transform (DCT) circuit 20, and the resulting coefficients are quantized by a quantizer 22 to reduce the number of values for encoding. The quantized DCT coefficients from the quantizer 22 are input to an encoding circuit 24. The encoded coefficients from the encoding circuit 24 are input to the multiplexer 18 where they are combined with the motion vector to provide an output compressed signal. The quantized DCT coefficients from the quantizer 22 also are input to an inverse quantizer 26 to obtain the decoded DCT coefficients. The DCT coefficients are input to an oddification circuit 28 and coefficient [7,7] is adjusted, if necessary, according to the ISO/IEC 13818-2 Standard as discussed above. The adjusted coefficients are input to an inverse DCT circuit 30 to recover the original differences for the current frame. The recovered differences are combined with the reference frame from the predictor and reference frame buffer 16 to reproduce the current frame. The reproduced current frame is processed according to the motion vector by the predictor and reference frame buffer 16 to produce the next reference frame.

To compensate for the oddification that occurs in a decoder, a pre-oddification circuit (PRE) 32 may be inserted after the quantizer 22 before the inverse quantizer 26 and encoding circuit 24. The pre-oddification circuit 32 obtains the sum of the inverse quantized DCT coefficients for each block of the current frame and tests whether the sum is odd or even. The pre-oddification circuit 32 includes an inverse quantizer 34, a summation test circuit 36 and a coefficient adjustment circuit 38. The inverse quantizer 34 generates the inverse quantized coefficients from the quantized DCT coefficients output by the quantizer 22. The summation test circuit 36 sums the inverse quantized coefficients and provides an enable signal to the coefficient adjustment circuit 38 if the sum is even. The summation test circuit 36 may be in the form of an exclusive OR gate to which is input the least significant bit from each of the inverse quantized coefficients. If the sum is odd, nothing need be done and the quantized DCT coefficients pass through the coefficient adjustment circuit 38 to the encoding circuit 24 since the enable signal is not set. However, if the result is even, the enable signal is set and the coefficient adjustment circuit 38 changes the value of the last quantized coefficient. The quantized coefficient [7,7] may be either set to zero, which reduces the quality but eliminates accumulation of energy in that coefficient, or the quantized coefficient [7,7] may be incremented/decremented by one oppositely to the oddification step in the decoder, i.e., if the inverse quantized coefficient [7,7] is odd add one to the quantized coefficient [7,7] and vice versa.

A more optimal solution is attained further by adjusting the values in a quantizer matrix (qm) 40, i.e., the weighing coefficients, for the quantizer 22. The quantization matrix 40 is changed on a frame by frame and is adjusted to assure that it is possible to obtain inverse quantized DCI coefficients that sum to an odd value initially. This is especially effective when the quantization scale (qp) is constant over the frame.

*int* qm63=Quantization-Matrix [7,7]

*int* v=((qp*qm63)/32)*2

Quantization-Matrix [7,7]=((v+1)*16)/qp where qm63 is the last coefficient in the quantization matrix for the quantizer 22 and v is a variable. The values in the quantization matrix 40 may be set by an operator, or may be a function of the complexity of the current frame being compressed, i.e., adaptive quantization, as is well known in the art. This latter is especially valuable where the output data rate is intended to be maintained constant.

In this way by adding to or subtracting from the quantized coefficient [7,7] a "1", the inverse quantized coefficient [7,7] is changed from odd to even, and vice versa, so that the sum of the inverse quantized coefficients is always odd. This technique retains more precision prior to quantization, improving quality and decreasing quality loss over multiple generations.

As shown in FIG. 2 the average bit rate and peak signal to noise ratio may be relatively constant using pre-oddification over multiple stages of encoding/decoding in cascade. Thus the present invention provides pre-oddification for the quantized DCT coefficients in an encoder so that the decoder does not use oddification that would increase high frequency noise.

What is claimed is:

1. An improved method of correcting in a compressed video encoder for oddification in a compressed video decoder of the type having the steps of transforming and quantizing a current frame of video data to produce quantized coefficients, encoding the quantized coefficients to produce a compressed video signal and decoding the quantized coefficients to produce a predicted video frame for use in compressing a next frame of video data, the decoding step including the step of oddifying inverse quantized coefficients to produce oddified coefficients which are used to produce the predicted video frame, wherein the improvement comprises the further steps of:

inverse quantizing the quantized coefficients to obtain preoddified coefficients;

summing the preoddified coefficients to obtain a weighted sum;

determining the oddity of the weighted sum;

adjusting a specified coefficient among the quantized coefficients if the weighted sum is even as indicated by the determining step to produce adjusted quantized coefficients; and inputting the adjusted quantized coefficients as the quantized coefficients for the encoding and decoding steps.

2. The method as recited in claim 1 wherein the adjusting step comprises the step of setting the specified coefficient to zero.

3. The method as recited in claim 1 wherein the adjusting step comprises the step of modifying the specified coefficient according to its oddity if the weighted sum is even so that the weighted sum becomes odd.

4. The method as recited in claim 3 further comprising the step of setting values in a quantization matrix used by the quantizing step to assure that initially it is possible for the weighted sum to be odd.

5. The method as recited in claim 4 wherein the setting step includes the step of determining the values in the quantization matrix as a function of the complexity of the video data.

6. An improved compressed video encoder of the type that has means for generating transform coefficients representing a current frame of video data, means for quantizing the transform coefficients to produce quantized coefficients, means for encoding the quantized coefficients to produce a compressed video signal and means including oddification for decoding the quantized coefficients to produce a predicted frame of video data for use in compressing a next frame of the video data, wherein the improvement comprises means for pre-oddifying the quantized coefficients to produce adjusted coefficients that are input as the quantized coefficients to the encoding and decoding means.

7. The encoder as recited in claim 6 wherein the pre-oddifying means comprises:

means for inverse quantizing the quantized coefficients to obtain pre-oddified coefficients;

means for summing the pre-oddified coefficients to obtain a weighted sum; and means based upon the oddity of the weighted sum for adjusting a specified coefficient among the quantized coefficients to produce the adjusted coefficients.

8. The encoder as recited in claim 7 further comprising means for setting values in a quantization matrix for the quantizing means to assure that it is possible initially for the weighted sum to be odd.

* * * * *